(12) United States Patent
Diab

(10) Patent No.: US 9,999,234 B1
(45) Date of Patent: Jun. 19, 2018

(54) APPARATUS FOR SKINNING POULTRY PRODUCTS

(71) Applicant: Remington Holdings LLC, Columbus, OH (US)

(72) Inventor: Benjamin C. Diab, Westerville, OH (US)

(73) Assignee: Remington Holdings LLC, Columbus, OH (US)

( * ) Notice: Subject to any disclaimer, the term of this patent is extended or adjusted under 35 U.S.C. 154(b) by 0 days. days.

(21) Appl. No.: 15/598,399

(22) Filed: May 18, 2017

(51) Int. Cl.
 *A22C 21/00* (2006.01)

(52) U.S. Cl.
 CPC ...... *A22C 21/0092* (2013.01); *A22C 21/0053* (2013.01)

(58) Field of Classification Search
 CPC .......................... A22C 21/00; A22C 21/0092
 USPC ................... 452/125, 127, 128–130
 See application file for complete search history.

(56) References Cited

U.S. PATENT DOCUMENTS

| | | | | |
|---|---|---|---|---|
| 5,766,066 A * | 6/1998 | Ranniger | ............... | A22B 5/166 452/125 |
| 6,264,542 B1 * | 7/2001 | Gasbarro | ........... | A22C 21/0092 452/125 |
| 6,699,116 B1 | 3/2004 | Gasbarro | | |
| 7,172,502 B1 * | 2/2007 | Bergman | ............... | A22B 5/166 452/129 |
| 7,198,563 B2 * | 4/2007 | Bergman | ............... | A22B 5/166 452/129 |
| 7,244,174 B2 * | 7/2007 | Schill | ..................... | A22B 5/166 452/130 |
| 7,662,031 B1 * | 2/2010 | Gasbarro | ............... | A22C 17/12 452/130 |
| 8,187,060 B1 * | 5/2012 | Gasbarro | ........... | A22C 21/0092 452/125 |
| 8,272,927 B2 * | 9/2012 | Gasbarro | ........... | A22C 21/0092 452/125 |

* cited by examiner

*Primary Examiner* — Richard T Price, Jr.
(74) *Attorney, Agent, or Firm* — Jason H. Foster; Kremblas & Foster

(57) ABSTRACT

A poultry skinner includes conveyors to engage the upper and lower surfaces of a poultry product. A rotatably mounted gripper engages the lower surface of the poultry. A pinch block with an arcuate surface is mounted in closely spaced relationship to the gripper fins for trapping the poultry product skin. The upper conveyor belt extends around laterally-oriented guides that mount in frame members at the sides of the food product path, and springs bias the belt outwardly to press the food product against the gripper and to take up slack in the belt by vertical movement of the ends of the guides. The gripper and the pinch block mount, with an adjusting mechanism, to end supports so the components may be removed as a unit and the position of the pinch block relative to the gripper may be adjusted.

16 Claims, 11 Drawing Sheets

APPARATUS FOR SKINNING POULTRY PRODUCTS

BACKGROUND OF THE INVENTION

This invention relates generally to skinning devices, and more particularly to a device for removing the skin from poultry pieces.

It is known in the art that there is a need for efficient and safe machines to process meats, and poultry in particular. U.S. Pat. No. 6,264,542 to Gasbarro, which is incorporated herein by reference, was a substantial advance in the technology relating to the skinning of poultry using machinery. This patent teaches a device that avoids the danger to humans of hand-skinning, and provides continuous, consistent results.

In the '542 patent, an apparatus for skinning pieces of poultry product is illustrated and described. FIG. 4 of that patent shows a conventional endless belt conveyor 31 employed to load product and carry it to the feed inlet 28 where it is delivered to a skinning station. The belt 40 is mounted on a support block 64 and is driven by a motor to rotate in a clockwise direction. The support block 64 is mounted to the cabinet sidewall 26 in a vertically movable relationship, thereby permitting the gap between the lower run of the belt 40 and the gripper 42 to automatically adjust to the size of poultry sections received therebetween. This can be accomplished, for example, by a pivot at the leftward end of the support block 64 about which the support block 64 pivots, or a plurality of vertical bearing rods extending through the support block 64, permitting vertical movement. The driven shaft 58 forms a pivot axis for the support block 64. The weight of the support block 64 and its attached structures biases the block downwardly toward the gripper 42 at its rightward end as shown in FIG. 1. Thus, poultry sections placed by the conveyor 31 between the belt 40 and the gripper 42 cause the support block 64 to adjust upwardly to the size of the sections to be skinned, and yet maintains a substantially constant downward force on the poultry section during the skin removal operation.

The belt 40 transports pieces of poultry section entering the feed inlet 28 to the gripper 42, and over the gripper 42. The gripper 42 is rotatably mounted to the frame 20 and is driven by a conventional motor to rotate in a counterclockwise direction so that the top of the gripper 42 moves in the same direction as the lower run of the belt 40. The belt 40 and the gripper 42 cooperatively move the poultry sections toward the discharge outlet, and function in cooperation with the pinch block 44 to engage and pull the outer skin off the poultry sections.

Although the '542 patent teaches a machine with many advantages, further refinement of the conventional technology is desired, particularly with the accommodation of poultry piece sizes. Therefore, there is a need for an improved poultry skinning machine.

BRIEF SUMMARY OF THE INVENTION

Disclosed herein are various embodiments of an automated poultry product skinning apparatus. One embodiment includes a support frame having a product inlet and a product outlet near opposite longitudinal ends of the support frame. A laterally-oriented gripper rotatably mounts to the frame and has a plurality of radially extending fins for engaging a lower side of the poultry product. A laterally-oriented pinch block includes an arcuate surface fixedly positioned in close clearance relationship to an arcuate path of the fins. A conveyor mounts to the support frame above the gripper and is aligned to engage an upper surface of a piece of poultry product delivered to the inlet and direct the poultry product in a product path over the gripper and toward the outlet. The conveyor includes an endless loop belt that extends around, and is biased toward the gripper by, a laterally-oriented first guide having opposing first and second ends. The ends are moveably mounted to the support frame near opposite lateral edges of the product path to permit vertical movement of the first and second ends of the first guide relative to the support frame.

In another embodiment, the automated poultry product skinning apparatus comprises a first spring mounted between the first guide's first end and the support frame. The first spring biases the first guide's first end toward the gripper. A second spring is mounted between the first guide's second end and the support frame. The second spring biases the first guide's second end toward the gripper independently of the first guide's first end.

In another embodiment, the automated poultry product skinning apparatus comprises a laterally-oriented second guide disposed downstream from the first guide and around which the endless loop belt extends. The second guide has opposing first and second ends that are moveably mounted to the support frame near opposite lateral edges of the product path. These ends permit vertical movement of the first and second ends of the second guide relative to the support frame. A third spring mounts between the second guide's first end and the support frame. The third spring biases the second guide's first end toward the gripper. A fourth spring mounts between the second guide's second end and the support frame. The fourth spring biases the second guide's second end toward the gripper independently of the second guide's first end. The second guide is configured to move relative to the gripper and relative to the first guide. The opposing ends of the first guide may be slidably mounted in first and second slots in opposing supporting frame sidewalls, and the opposing ends of the second guide may be slidably mounted in third and fourth slots in opposing supporting frame sidewalls.

In another embodiment, the automated poultry product skinning apparatus comprises a laterally-oriented third guide around which the endless loop belt extends. The third guide may have opposing first and second ends that are moveably mounted to the support frame near opposite lateral edges of the product path to permit vertical movement of the first and second ends of the third guide relative to the support frame. A fifth spring mounts between the third guide's first end and the support frame. The fifth spring biases the third guide's first end away from the gripper. A sixth spring mounts between the third guide's second end and the support frame. The sixth spring biases the third guide's second end away from the gripper independently of the third guide's first end. The third guide is configured to move relative to the gripper and relative to the first and second guides. The support frame may have first and second sidewalls spaced apart and positioned on opposite lateral sides of the product path. The first and second sidewalls may have a first pair of elongated slots in which the opposing ends of the first guide are slidably mounted, a second pair of elongated slots in which the opposing ends of the second guide are slidably mounted, and a third pair of elongated slots in which the opposing ends of the third guide are slidably mounted.

Further disclosed herein is an automated poultry product skinning apparatus including a support frame having a product inlet and a product outlet near opposite longitudinal ends of the support frame. A conveyor mounts to the support frame and is aligned to engage the upper surface of a piece of poultry product delivered to the inlet and direct the poultry product in a product path toward the outlet. A laterally-oriented gripper has a plurality of radially extending fins disposed below the conveyor for engaging a lower side of the poultry product passing in the product path between the gripper and the conveyor. A laterally-oriented pinch block includes an arcuate surface fixedly positioned in close clearance relationship to an arcuate path of the fins during a portion of their rotation to define an opening configured to engage the outer skin attached to the poultry product between the fins and the arcuate surface of the pinch block. The close clearance relationship and the opening are configured to firmly entrap the attached outer skin between the fins and the arcuate surface of the pinch block to pull the outer skin from its attachment to the underlying muscle portions of the poultry product.

First and second support members are removably mounted to the support frame on opposing first and second lateral sides of the product path. The gripper rotatably mounts to, and between, the first and second support members. The pinch block mounts to and between the first and second support members. An adjuster mounts to the first and second support members and drivingly links to at least one of the gripper and the pinch block for adjusting the opening between the gripper and the pinch block. The gripper, the pinch block and at least a portion of the adjuster are configured to be removed from the support frame with the first and second support members as a unit.

In one embodiment, the adjuster is mounted to the first and second support members and drivingly linked to a plate to which the pinch block is mounted. The adjuster may further comprise first and second members rotatably mounted through first and second yokes that are attached near opposite ends of the plate, the members having cam surfaces configured to seat against ears extending from the support members. The skinning apparatus may comprise a rod rotatably mounted through the first and second yokes and attached to the first and second members. The skinning apparatus may further comprise at least one plate-connecting rod member mounted to the first and second plates, wherein said at least one plate-connecting rod member is configured to rest in at least one channel formed in a frame member.

Further disclosed herein is a poultry skinning apparatus having a frame with a product inlet and a product outlet near opposite longitudinal ends of the support frame. A conveyor mounts to the frame and is aligned to engage the upper surface of a piece of poultry product delivered to the inlet and direct the poultry product in a product path toward the outlet. First and second end supports are removably mounted to the frame on opposing first and second lateral sides of the product path. A laterally-oriented gripper is rotatably mounted to, and between, the first and second end supports. The gripper may have a plurality of radially extending fins disposed below the conveyor for engaging a lower side of the poultry product passing in the product path. A laterally-oriented pinch block may be slidably mounted to, and between, the end supports. The pinch block includes an arcuate surface fixedly positioned in close clearance relationship to an arcuate path of the fins during a portion of their rotation to define an opening configured to engage the outer skin attached to the poultry product between the fins and the arcuate surface of the pinch block. The close clearance relationship and the opening are configured to firmly entrap the attached outer skin between the fins and the arcuate surface of the pinch block to pull the outer skin from its attachment to underlying muscle portions of the poultry product. The pinch block also includes pinch block supports rigidly mounted to the pinch block. At least one prime mover mounts to the frame and is configured to displace the pinch block relative to the first and second end supports. First and second cam surfaces are movably mounted to a first of the supports, and the cam surfaces are rigidly connected together and seat against a second of the supports for adjusting the opening between the gripper and the pinch block. The gripper, the pinch block, the cams and the end supports are configured to be removed from the frame as a unit.

In another embodiment, the first and second cam surfaces are rigidly mounted to a rod that is rotatably mounted to the pinch block supports and seat against ears extending from rigid attachment to the end supports. The pinch block supports may further comprise first and second yokes that are attached near opposite ends of a plate that is rigidly and removably mounted to the pinch block. The rod may rotatably mount through the first and second yokes and attach to the structures defining the cam surfaces. At least one plate-connecting rod member may mount to the end supports, and the at least one plate-connecting rod member may be configured to rest in at least one channel formed in the frame.

Figure 1:
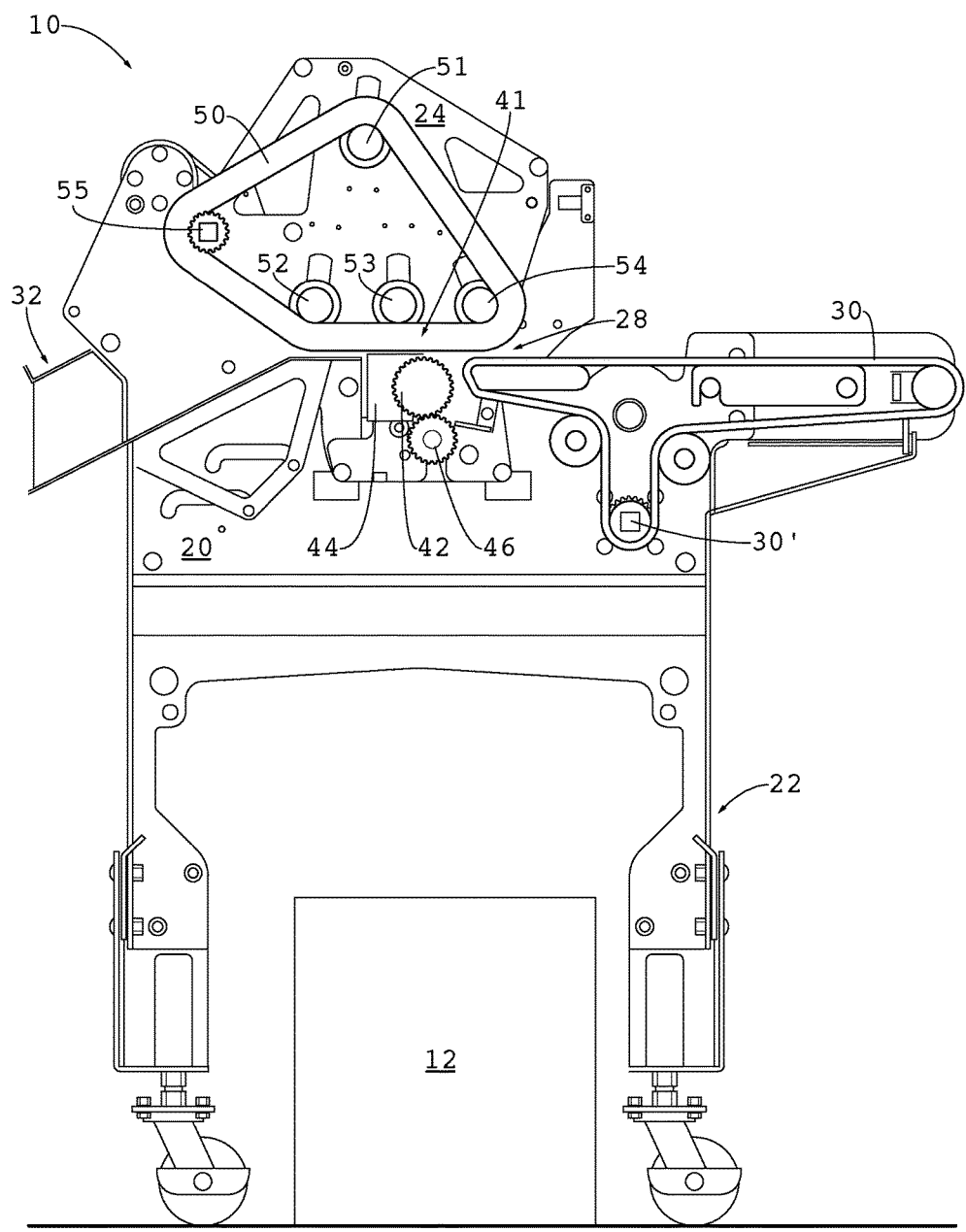
FIG. 1 is a side view in section along the line 5-5 of FIG. 4B illustrating an embodiment of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

U.S. Pat. Nos. 6,264,542; 6,699,116; and 8,187,060, all to Gasbarro, are incorporated herein by reference.

FIG. 1 shows an embodiment of a skinning apparatus 10 having a supporting frame 20, which can be mounted on a base or table 22 for conveniently locating the apparatus 10 and auxiliary product and skin collection means where desired in a food-processing facility. The table 22 may have legs, or any other support, with wheels or other structures that permit movement around a food-processing facility. All structures of the apparatus 10 are made of food grade steel, such as stainless steel, unless noted otherwise.

The bottom of the frame 20 is open for directing a skin portion removed from the poultry sections to a collection area, such as the bin 12 or a conveyor (not shown) beneath the frame 20. A rear discharge opening in the frame 20 includes a ramp-like chute 32 that directs the skinned poultry product, which is preferably maintained separate from the removed skin, to a collection area via the chute 32. The separate collection area for the skinned product may be a conventional bin or a conveyor (not shown).

Figure 2:
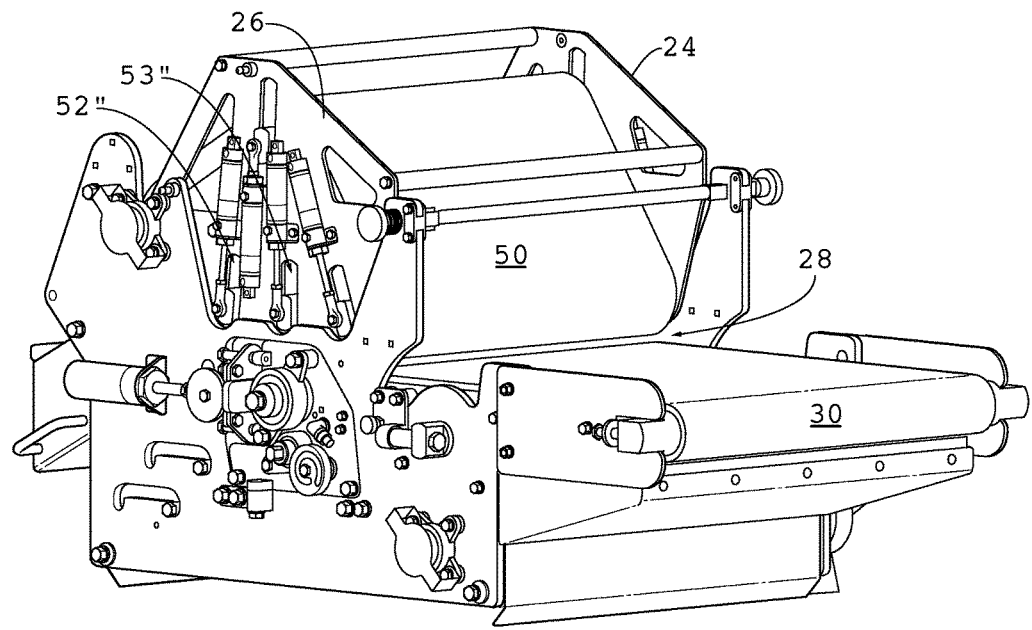
FIG. 2 is a view in perspective illustrating the embodiment of FIG. 1 with some safety equipment, such as covers and shields, removed for visibility purposes.

Referring to FIG. 2, the support frame 20 includes a first sidewall 24 and a second sidewall 26 that is laterally spaced from the first sidewall 24 a distance that permits poultry products to pass therebetween as the poultry products are conveyed longitudinally through a product path. The sidewalls 24 and 26 may be mounted to other frame structures in a manner that is well-known to those of ordinary skill in the art, such as by welding or removable fasteners. An opening is defined between the sidewalls 24 and 26 and forms a product feed inlet 28. A longitudinal axis of the apparatus 10 extends substantially equally between the sidewalls 24 and 26 from the feed inlet 28 to a discharge outlet, which may be the chute 32.

A conventional endless belt conveyor 30 may be employed to receive unskinned poultry product and carry it downstream to the feed inlet 28 where the product is delivered to a skinning station 41 (see FIG. 5), which is described below in more detail. Other forms of conveying the poultry product to the feed inlet 28 may be employed to deliver the product to the skinning station 41 without departing from the present invention.

The terms "upstream" and "downstream" are relative terms referring to directions from positions on the apparatus 10 relative to the direction product placed in the apparatus 10 moves through the apparatus 10 during normal operation. The direction that the product moves during normal operation is from the right side of FIG. 1 toward the left side, and through the product path that is between the sidewalls 24 and 26. Thus, the right end of the conveyor 30 is upstream of the left end of the conveyor 30, and the ramp-like chute 32 is downstream of the conveyor 30.

Referring again to FIG. 1, the conveyor 30 includes a drive roller 30' that is drivingly linked to a prime mover, such as an electric motor 6, by a drive belt 7. In cooperation with a plurality of idle rollers, the drive roller 30' advances the top surface (in the orientation of FIG. 1, which is the orientation for subsequent descriptions unless noted otherwise) of the endless loop conveyor 30 toward the product feed inlet 28. Thus, any products, such as poultry breasts, thighs, wings or other pieces placed on the top surface of the conveyor 30 are advanced by the conveyor 30 toward the product feed inlet 28 in a manner understood by the person of ordinary skill. Of course, other conveyors can be used, such as a plurality of cylinders or wheels having laterally-oriented axles.

At the product feed inlet 28, the downstream end of the conveyor 30 extends beneath the upstream end of a belt 50. The conveyor 30 and the belt 50 may make contact or a gap varying between a fraction of an inch and about three inches may be formed therebetween. Poultry products placed on the conveyor 30 are driven into contact with the belt 50, which advances the poultry products further downstream along the product path after pinching the poultry products between the two advancing conveying structures (the belt 50 and the conveyor 30).

The belt 50 may be formed of flexible material, such as food grade rubber, urethane or similar, forming an endless loop in the manner of a conveyor belt. Alternatively, the belt 50 may be made from a plurality of relatively non-flexible, but pivotably-linked pieces, which may be plastic or metal, extending in an endless loop. Rigid ribs may be fastened, such as by adhesive or integral molding, to the material constituting the belt 50. The ribs of the belt enable the belt 50 to drive the poultry sections coming into contact with the belt 50 in the desired direction. The relative spacing of each of the ribs can be varied to provide sufficient grip for many poultry types. The belt 50 may alternatively be a metal "sticker chain", which is a chain with sharp teeth that penetrate into or otherwise grip the poultry to ensure movement of the food product. The belt 50 may be the width of the apparatus 10 between the sidewalls 24 and 26, but may be smaller discrete widths aligned laterally to form a structure having an effective width between the sidewalls 24 and 26.

Figure 4A:
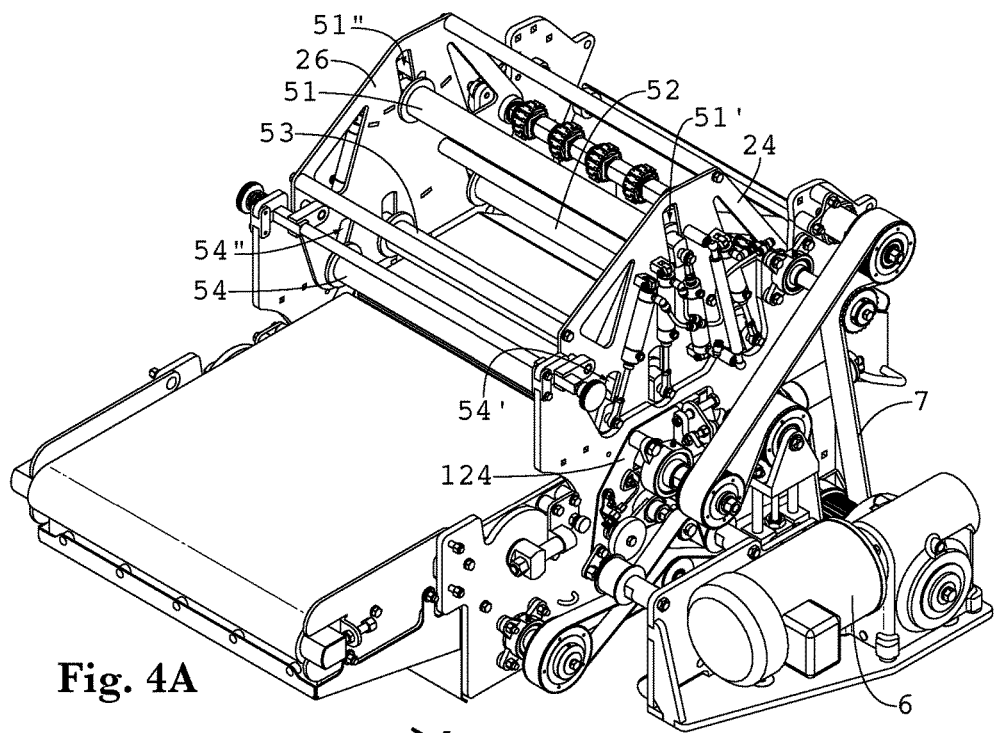
FIG. 4A is a view in perspective illustrating the embodiment of FIG. 2 with the belt 50 removed.
Figure 4B:
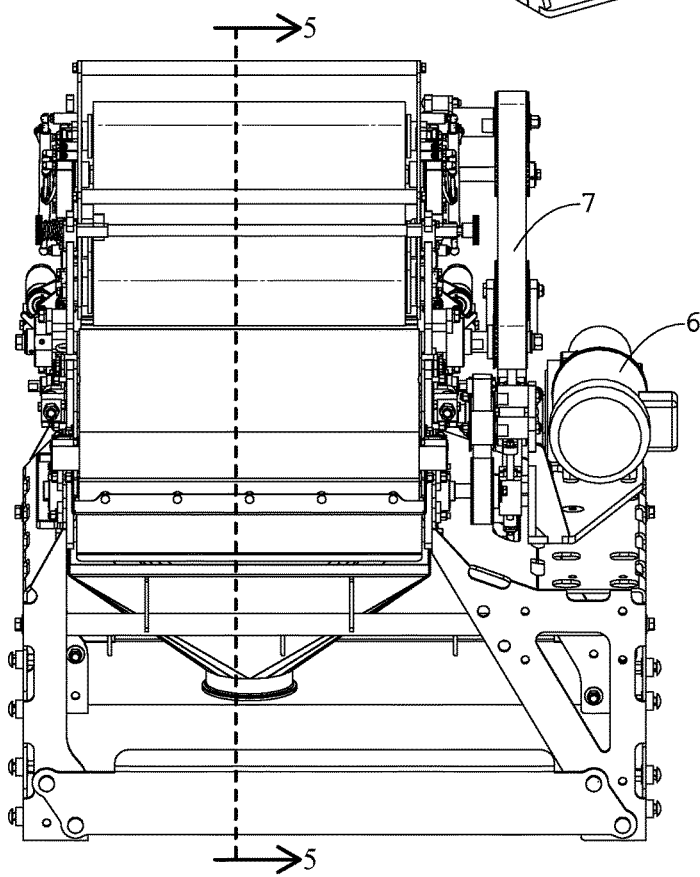
FIG. 4B is a view in perspective illustrating an embodiment of the present invention.

The belt 50 is driven in a clockwise direction in the orientation shown in FIG. 1 by the conventional electric motor 6 that advances the driven gear 55. A drive belt 7, which may be a flexible, cogged belt or any other equivalent structure, extends around a driven gear on the motor 6, and extends around other sprockets and/or gears as shown in FIGS. 4A and 4B. The belt 7 may be driven via a gear 55' that is drivingly linked to, such as by being on the same axle as, the driven gear 55. The drive belt 7 preferably extends around the gear 55', other gears and idler rollers such that a single drive belt 7 is all that is needed to advance the belt 50 and the conveyor 30, along with other structures on the apparatus 10, although this is not required.

The belt 50 may be mounted on belt guides, such as the four, laterally-oriented belt guides 51, 52, 53 and 54, by extending entirely around the guides 51-54 and the gear 55 and forming a closed loop belt. The guides 51-54 may be idler rollers having a central axle that is rotationally fixed relative to the frame 20 and an outer cylinder that moves rotationally relative to the axle. Alternatively, the guides 51-54 may be very low friction polymer (e.g., acetal homopolymer resin, such as that sold under the trademark DELRIN) that does not rotate relative to the frame, and guides the belt 50 around its path of advancement. The guides 51-54 are preferably cylindrical with circumferential rings near opposing ends to limit lateral movement of the belt 50.

The number of the guides 51-54 is not critical, although it may be preferred to have at least one, more preferably two, and most preferably three such guides on the lower span of the belt 50 in order to guide the belt 50 over the entire skinning station 41 and provide consistent and even pressure on the food products passing thereunder. The number of guides will be determined, at least in part, by the size of the product that will be advanced by the belt 50, and the size of the skinning station 41. A guide is generally desired every five to six inches along the length of the belt 50 where the belt 50 will advance chicken breasts, thighs and other similarly-sized pieces, but this is not critical.

Typically, the belt 50 is substantially taut between each of the guides 51-54 and the gear 55, although some slack may be acceptable based on the belt's 50 material properties and other factors. The guides 51-54 are laterally oriented, which means the guides 51-54 extend transverse, and preferably perpendicular, to the longitudinal orientation of the apparatus 10. The longitudinal direction is the direction food products travel in normal operation of the apparatus 10.

The guides 51-54 may be mounted at their opposite ends to the sidewalls 24 and 26 in a vertically-movable relationship, which may include being aligned exactly vertically, but also includes having a vertical component (e.g., at 5, 15, 30, and 45 degrees to vertical, etc.). This vertically-moveable relationship permits a gap formed between the lower span of the belt 50 and the gripper 42 (described below) and/or the conveyor 30 to automatically adjust to the size of poultry sections received therebetween from the product feed inlet 28. There are various relationships between the guides 51-54 and the frame 20 that will permit vertical movement, and all such relationships will become apparent to the person of ordinary skill from the description herein. Only some such relationships are described herein, but this is not to imply that others are excluded.

Figure 3:
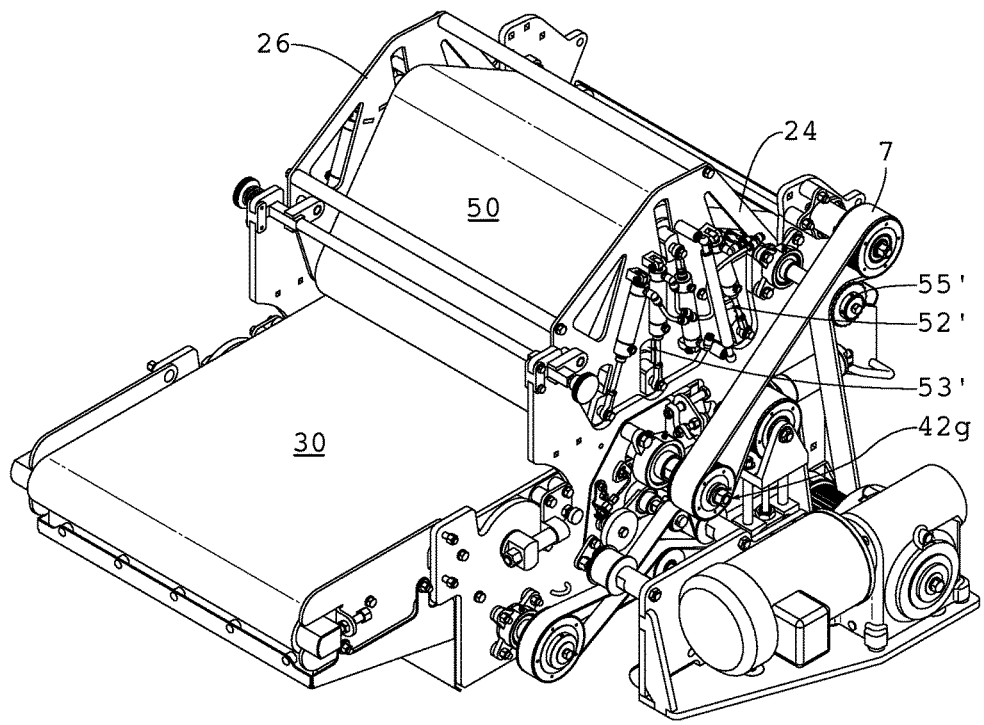
FIG. 3 is a view in perspective illustrating the embodiment of FIG. 2.

In one embodiment, which is shown in FIG. 4A, the guide 51 is oriented laterally across the product path, and the opposite ends of the guide 51 are slidably mounted in vertically-oriented slots formed in the sidewalls 24 and 26, such as the slots 51' and 51". The ends of the guide 51 are slightly undersized relative to the slots 51' and 51" so that the guide's ends may slide along the lengths of the slots 51' and 51" with little resistance due to friction. The use of low friction plastic is particularly advantageous with the guides 51-54 in this configuration. Bolts or other fasteners that are larger than the slots 51' and 51" may be mounted with their larger heads on the opposite sides of the sidewalls 24 and 26 from the guide 51, thereby preventing removal of the guide ends from the slots, but this is not critical. The opposite ends of the guide 54 are similarly slidably mounted in vertically-oriented slots in the sidewalls 24 and 26, such as the slots 54' and 54". FIGS. 2-3 show the corresponding, vertically-oriented slots 52', 52", 53' and 53" in which the ends of the respective guides 52 and 53 are similarly inserted. Thus, each of the guides 51-54 is mounted at opposite ends in corresponding slots on the sidewalls that permit the ends of each guide to be displaced vertically along the slot. Although the above embodiment discloses slots in which the guides are movably mounted, it is contemplated that other structures may be used. For example, guides may be mounted on arms pivotably mounted to the sidewalls 24 and 26, and coil, rotary or torsion springs may be used to bias such guides away from and/or toward the gripper 42.

Figure 6:
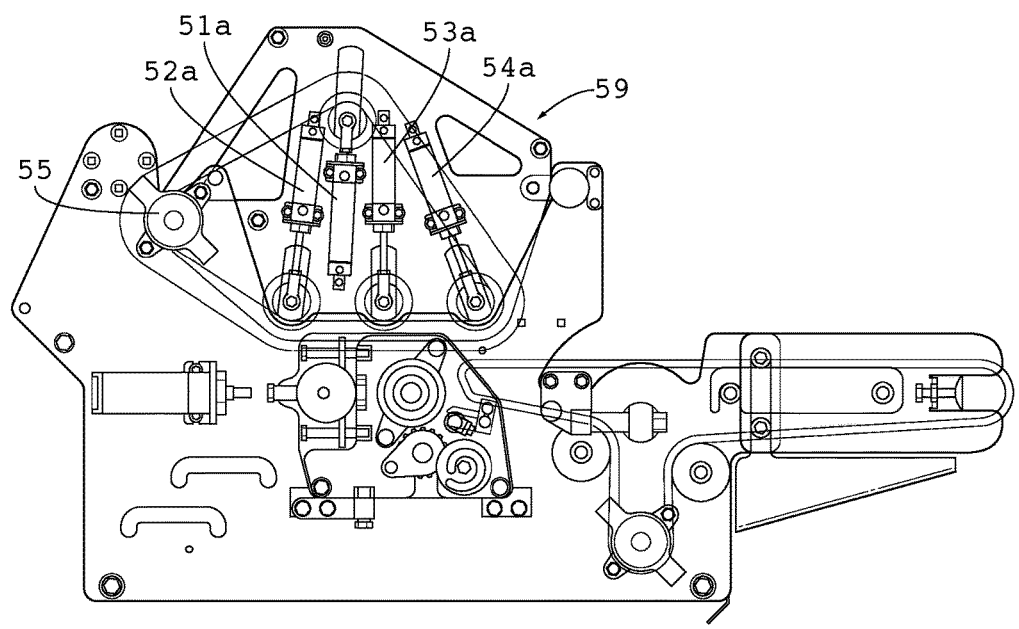
FIG. 6 is a schematic right side view (with some components shown transparent) illustrating the embodiment of FIG. 2 with the base removed.
Figure 7A:
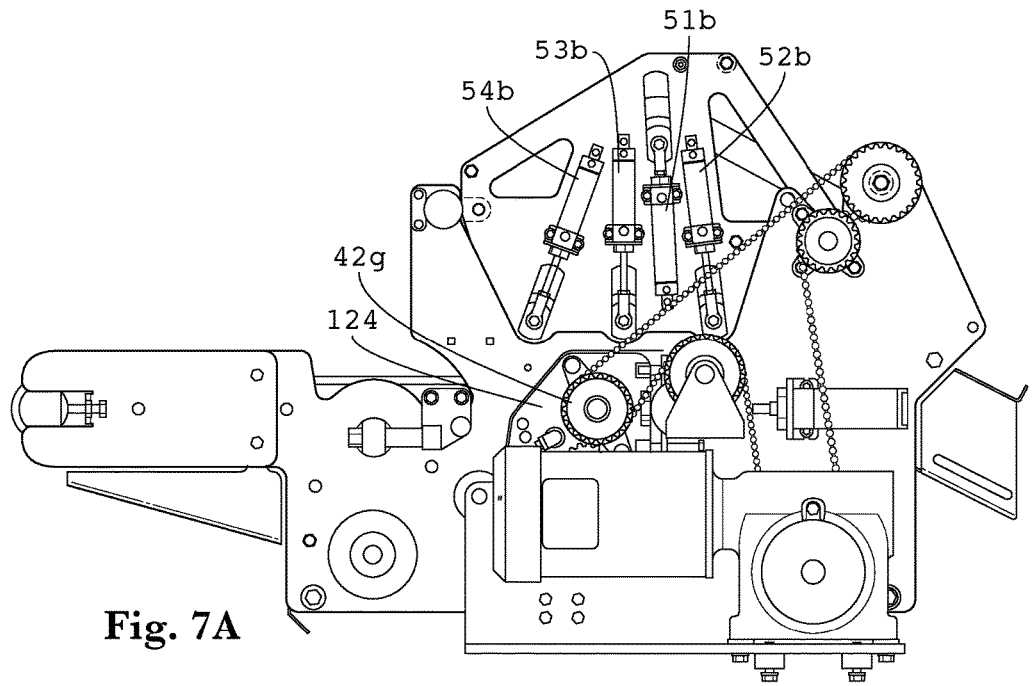
FIG. 7A is a left side view illustrating the embodiment of FIG. 2.

It should be noted that each end of each of the guides 51-54 may move independently of the opposite end of that same guide. Furthermore, each guide may move independently of each other guide. This configuration permits a poultry product that may reach the feed inlet 28 at a first end of the guide 54 to displace only that first end of the guide 54 and not the opposite, second end of the guide 54. If a much thinner poultry product reaches the second end of the guide 54 at the same time that the thicker product reaches the first end of the guide 54, both products will be contacted by the belt 50, and the movement of the guide 54 at the first end due to the thicker product will not displace the entire guide 54 away from the product path but will receive and convey the thinner product. The invention thus provides independently-applied, downward pressure on all poultry products that pass through the product path by the belt at each of the guides 52-54, and this causes even and consistent pressure to be applied to all poultry pieces, regardless of location under the assembly's guides 52-54 and belt 50. The entire assembly of the sidewalls 24 and 26, the guides 51-54, the driven roller 55 and the belt 50 may be removable as a unit, or pivotably mounted to the remainder of the frame 20 in an upwardly and downstream direction The ends of the guides 51-54 may be mounted to devices that controllably resist the movement of the guides in the slots in one or both directions, and such devices may include apparatuses that provide a bias, such as a gas spring, and a dashpot, such as a friction brake. There may be a bias device mounted at each guide end to apply substantial bias to urge each of the guides 51-54 in the preferred direction. The preferred, but not required, bias direction for the guides 52-54 is downwardly toward the gripper 42, and for the guide 51 is upwardly away from the gripper 42. This provides a generally radially outward bias against the belt 50, which provides the benefit of maintaining tension in the belt 50, as well as resisting movement induced by the poultry product extending under the belt 50. One contemplated structure is a pneumatic spring that resists the movement as a bias, and also directs gas through one or more small orifices, thereby consuming energy as a dashpot. The pneumatic springs 51a, 51b, 52a, 52b, 53a, 53b, 54a and 54b are mounted to opposite ends of the guides 51-54, respectively, as shown in FIGS. 6 and 7, and the opposite end of each spring is mounted to the closest sidewall 24 or 26.

As a force is applied to each spring or pair of springs through a corresponding end of the guides 52-54 due to a poultry piece that is larger than the gap being pulled under the belt 50, the springs are compressed as one or both ends of the guides move upwardly along the respective slot or slots. As soon as the poultry piece is advanced from beneath the guides, the corresponding spring(s) force the guide end(s) back downwardly to form the original gap. The springs may thereby bias the guides 52-54 downwardly. It should be noted that the springs may be adjusted for the amount of force they apply at a given compression or expansion.

As the belt 50 is displaced upwardly along the bottom span due to upward movement of the guides 52-54 by the presence of poultry products below the belt 50, the tension along the belt 50 is reduced and slack may develop. The guide 51 is biased upwardly away from the product path in order to remove slack in the belt 50 that is caused by upward movement of the guides 52-54. The springs 51a and 51b bias the guide 51 in an upward direction so that the guide 51 is displaced upwardly when the belt 50 is loosened sufficiently, thereby automatically removing slack from the belt 50 and maintaining the desired tension of the belt 50. The springs that bias the guide 51 may apply a much higher force than the springs on the guides 52-54.

With the above construction, the belt 50 is driven around the guides 51-54 by the gear 55 to translate the lower run or span of the belt 50 just above the downstream end of the conveyor 30 and over the skinning station 41. As a piece of poultry is conveyed to the product feed inlet 28 by the conveyor 30, the product contacts the belt 50 at the downstream end and, because both the conveyor 30 and the belt 50 are advancing downstream (preferably at about the same speed), the product is pinched between the belt 50 and conveyor 30. The belt 50 and conveyor 30 pull the product therebetween and draw the product downstream over the skinning station 41.

If the thickness of the product is greater than the gap between the lower surface of the belt 50 and the upper surface of the conveyor 30, then at least one end of the most upstream guide 54 is displaced upwardly due to the size of the poultry product displacing the guide 54 out of the way. This upward displacement does not negatively affect the drawing in of the product, because the product maintains contact with the belt 50 and conveyor 30 due to the downward bias on the guide 54 by the springs 54a and 54b. The upward movement of the guide 54 may be at the guide end nearest the sidewall 24, the guide end that is nearest the sidewall 26, or both guide ends, depending upon the location of the product and thickness in comparison to the size of the original opening, the spring tension, and other factors that will be apparent to the person having ordinary skill in the technology. Of course, the spring tension in the pneumatic springs is adjustable.

Upon upward displacement of the guide 54, at least one of the springs 54a and 54b is compressed as the ends of the guide slide upwardly in the slots 54' and 54". As the poultry product is pulled further along by the belt 50, the next downstream guide 53 may be displaced upwardly, thereby compressing one or both of the springs 53a and 53b as one or both of the ends of the guide are displaced upwardly in the slots 53' and 53". As the poultry product advances further downstream, the guide 52 may be displaced upwardly, thereby compressing one or both of the springs 52a and 52b as the ends of the guide slide upwardly in the slots 52' and 52".

Once the poultry product advances downstream of the most upstream guide 54, the guide 54 is displaced downwardly by the springs 54a and 54b unless another poultry piece is immediately upstream of the first poultry piece. The guides 52 and 53 similarly return to their lowest levels under the influence of the corresponding springs. It is contemplated that only one end, or both ends, of one or more of the guides may be displaced by any piece of product that passes beneath. The displacement of any guide end will be determined by at least the thickness and position of the product along the length of the guide, the position of the guide above the conveyor 30, and the resistance of the spring to movement. Because multiple pieces of poultry may pass between the belt 50 and the gripper 42, it will be understood from the foregoing that consistent and even contact is maintained by the guides 52-54 pressing downwardly on the belt 50, and the belt pressing downwardly on the product or products, as the product or products pass beneath the belt and over the skinning station 41. With the apparatus 10, each piece of poultry that passes between the belt 50 and the gripper 42 is consistently skinned due to the consistent pressure.

Figure 5:
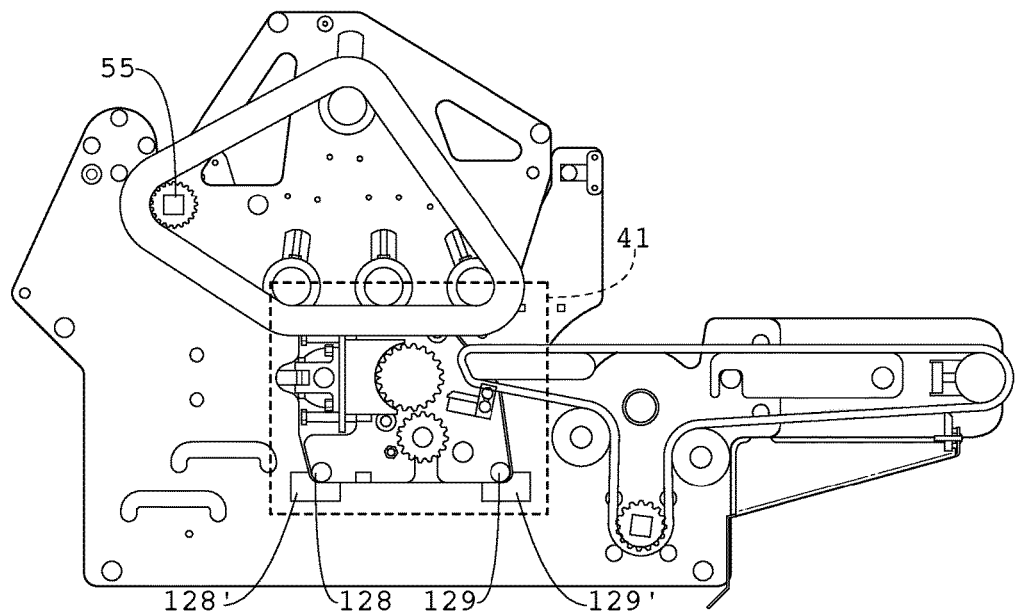
FIG. 5 is a side view in section illustrating the embodiment of FIG. 2 through the line 5-5 of FIG. 4B, and with the base removed.
Figure 7B:
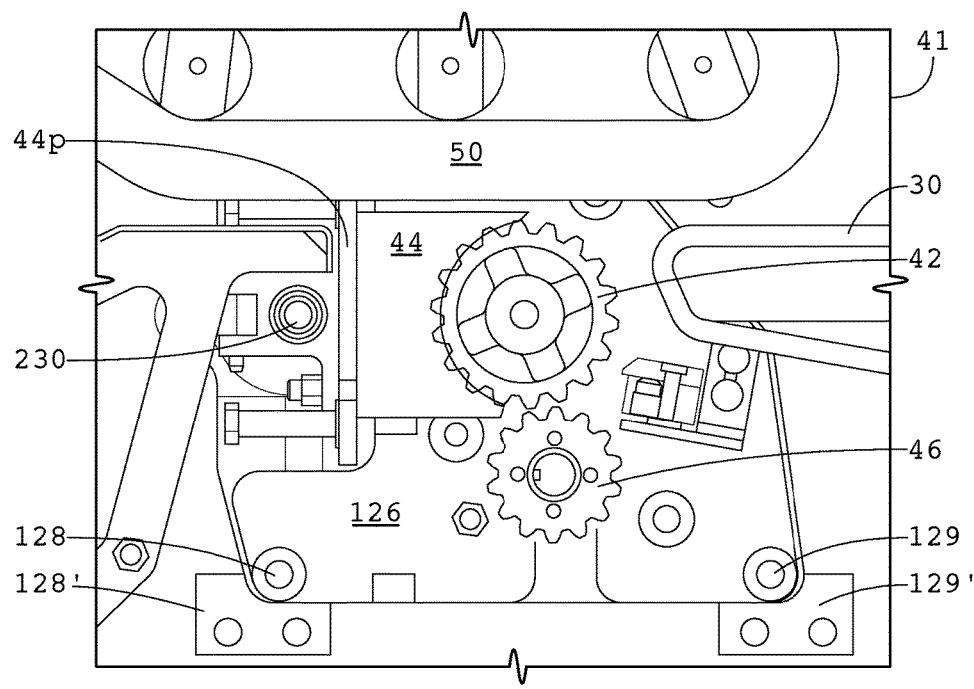
FIG. 7B is a magnified view illustrating the skinning station 41 of FIG. 5.

Returning again to the process of the poultry product being pulled past the downstream end of the conveyor 30 by the belt 50, the product passes beneath the belt 50 and enters the skinning station 41, which is illustrated in FIGS. 1, 5 and 7B. Thus, poultry sections placed on the conveyor 30 and conveyed to between the belt 50 and the gripper 42 cause the guides 52-54 to adjust upwardly to the size of the sections to be skinned, and the guides 52-54 maintain a substantially constant downward force on the poultry section during the skin removal operation. The belt 50 transports pieces of poultry entering the feed inlet 28 to, and over, the gripper 42 and pinch block 44, and the constant pressure aids in consistent skin removal through this process. When a poultry section enters the feed inlet 28 and is carried over the gripper 42 (also referred to as a "paddle wheel"), product larger than the defined space will cause the guide 54 to move upward in the slots 54' and 54" as described above and allow the forward end of the belt 50 that is operatively mounted thereon to move upwardly with the guide 54.

The gripper 42 may be rotatably mounted to the frame 20 directly or the gripper 42 may be mounted to a structure (described below) that is mounted to the frame 20. The gripper 42 may be driven by the belt 7 that drives the gear 42g to rotate in a counterclockwise direction (in the FIG. 1 illustration) so that the top of the gripper 42 moves in the same direction as the lower span or run of the belt 50. The belt 50 and the gripper 42 cooperatively move the poultry sections toward the discharge opening, and function in cooperation with the pinch block 44 to engage and pull the outer skin off the poultry sections as described below and in the patents incorporated herein by reference.

The gripper 42 comprises a generally cylindrical member provided with a plurality of raised projections or fins. A central bore is provided in the gripper 42 to fixedly receive a drive shaft. The pinch block 44 includes an arcuate surface disposed in an adjacent, close tolerance relationship to the arcuate path defined by the rotation of the outer surfaces of the fins of the gripper 42. The upper end of the arcuate surface closely mates with the end of each fin as it approaches the pinch block 44 during rotation.

A piece of poultry engaged by the belt 50 and the gripper 42 is carried toward the opening between the upper end of the pinch block 44 and the outer ends of the gripper 42. The gripper 42 engages the poultry product, and cooperates with a lip on the pinch block 44 to pinch or trap the skin of the poultry product. As the piece of poultry is carried toward the discharge opening by the combined action of the belt 50 and the gripper 42, which rotate at similar speeds, the gripper 42 continues to pull the point of engagement with the skin downwardly against the pinch block 44 and further remove the skin. The gripper 42 continues to pull portions of skin downwardly as the poultry piece is engaged by the gripper 42 and the belt 50, and the now-skinless poultry product continues to move toward the discharge opening and the chute 32. When the poultry product is completely skinned by the skinning station 41, the poultry product falls down the chute 32 under the force of gravity.

The skin of the poultry product continues to be pulled downwardly toward the lower apex of the gripper 42. In some cases, the skin falls from the gripper 42 under the force of gravity once the skin is no longer sufficiently held between the pinch block 44 and the gripper 42. In other cases, the skin will remain stuck to the fins of the gripper 42, in which case the skin must be removed from the gripper 42 by other means before the skin is carried back toward the top of the gripper 42 where it could interfere with the skinning of other poultry products. It is in this context that the cleaning roller 46 provides substantial advantages. The cleaning roller 46 may be substantially identical in construction to the gripper 42, but may have a smaller diameter. The axis of rotation of the cleaning roller 46 is substantially parallel to the axis of rotation of the gripper 42. The cleaning roller can be rotated by the same motor 6 and drive belt 7 that drives the belt 50, conveyor 30, and gripper 42, or it can be rotated by a separate motor. The cleaning roller 46 rotates in the same direction as the gripper 42 but at a significantly greater speed (at the tips). Thus, as the skin of the poultry product exits the pinch block 44 and is pulled down and forward by the fins on the lower left quadrant (see FIG. 7B) of the gripper 42, the skin is transferred to the fins on the upper left quadrant of the cleaning roller 46, which rotates in a down and downstream direction. The skin is thereby scraped and pulled off of the gripper 42 by the cleaning roller 46. The skin is then ejected in a downward direction from the rapidly rotating cleaning roller 46, which rotates faster and produces greater centrifugal force than the larger diameter gripper 42. The belt 50 then takes the skinned poultry product away from the skinning station 41 and to the discharge outlet.

As noted above, the skin on poultry products that are advancing toward the opening between the upper end of the pinch block 44 and the outer ends of the gripper 42 is drawn into that opening. The size of the opening between the outer surfaces of the gripper 42 and the arcuate surface of the pinch block 44 is important, because the thickness of the opening needs to be the appropriate thickness for the poultry product that is being skinned. Furthermore, consistency in the size of the opening along the entire length (across the lateral direction) of the gripper 42 and pinch block 44 is also desired. Because of the importance of this opening, adjustments made to the structures that define the opening must take the opening into consideration. With conventional machines used to skin poultry, the opening may be adjusted with some difficulty because the structures are mounted individually to the apparatus, and such adjustments are to each component separately. This makes such adjustments time-consuming, and they are adjusted by set screws that are manually adjusted on each end of the structures. The apparatus 10 has an advantageous structure that permits adjustment of one of the components relative to another, and the adjustment occurs substantially equally at both ends, as explained below. Furthermore, replacement of the skinning station structures is rapid.

The pinch block 44, the gripper 42 and the cleaning (counter) roller 46 may be rotatably mounted between end supports, which may be the plates 124 and 126. The combination of these structures may constitute a cartridge 110 that is shown at least in FIGS. 8, 9 and 10. The cartridge 110 may be modified from the structure shown and described, as will become apparent to the person of ordinary skill from the description herein, but such a modified structure may still provide a similar result to the cartridge 110 shown and described. The pinch block 44, cleaning roller 46, and gripper 42 of the cartridge 110 are described in the patents that are incorporated by reference. The cleaning roller 46 is optional in the present invention.

Figure 8:
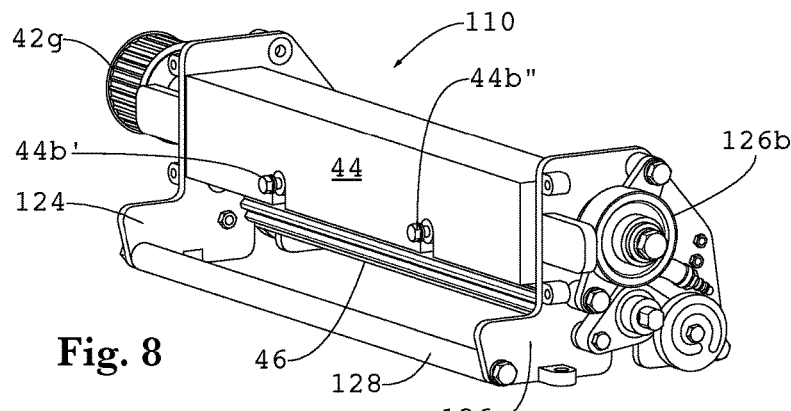
FIG. 8 is a view in perspective illustrating an embodiment of the cartridge.
Figure 9:
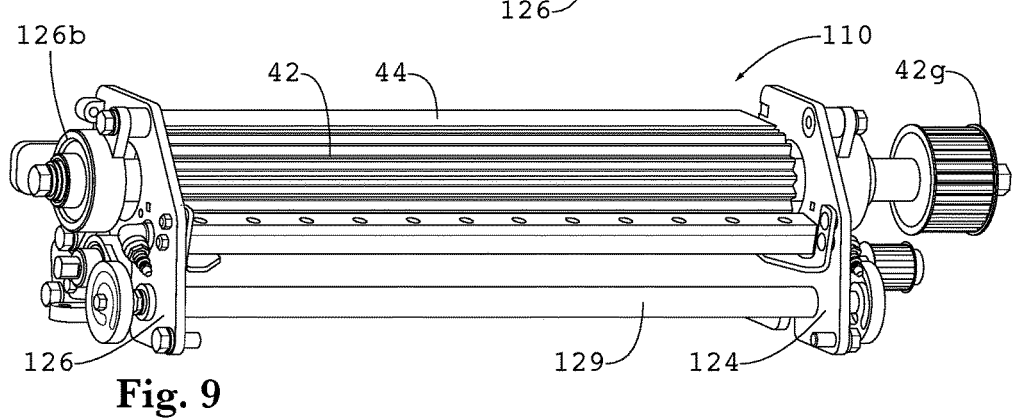
FIG. 9 is a view in perspective illustrating the embodiment of FIG. 8.
Figure 10:
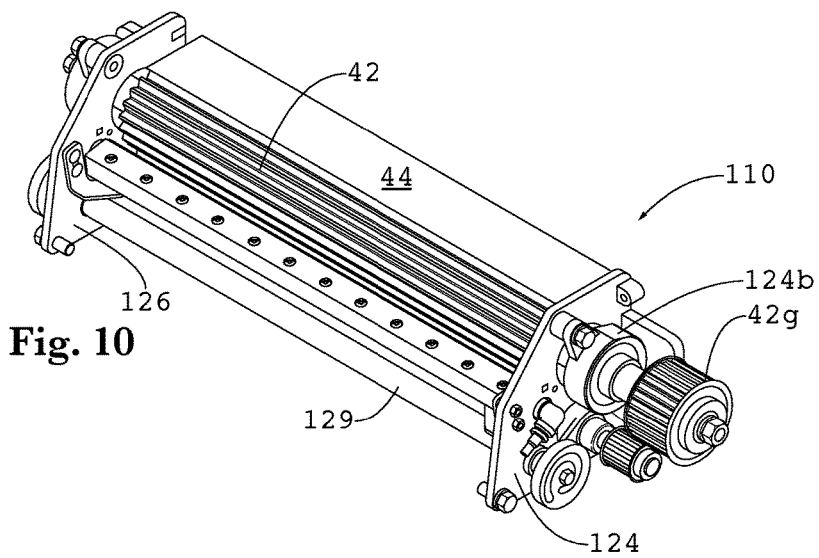
FIG. 10 is a view in perspective illustrating the embodiment of FIG. 8.
Figure 11:
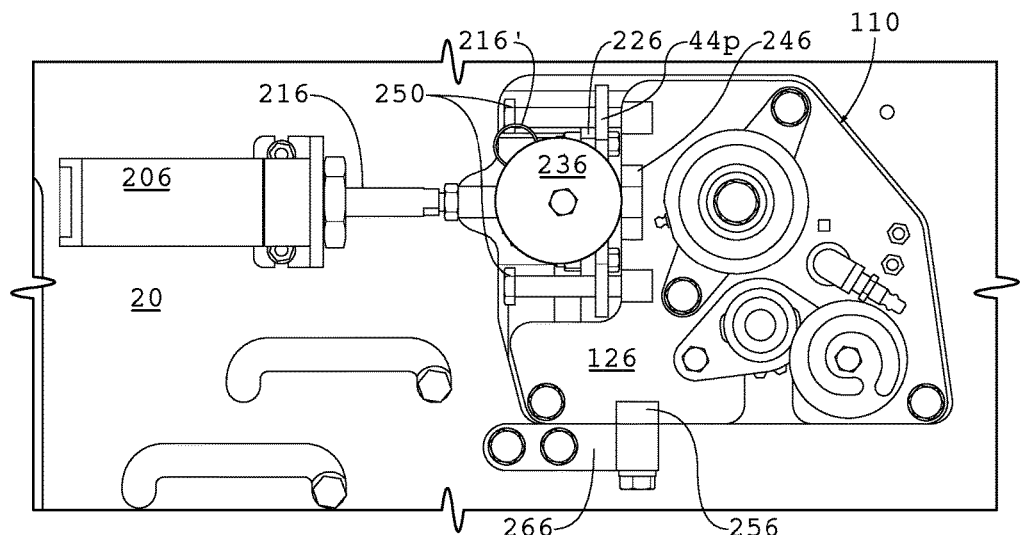
FIG. 11 is a right side view illustrating an embodiment that adjusts the position of the cartridge.
Figure 12:
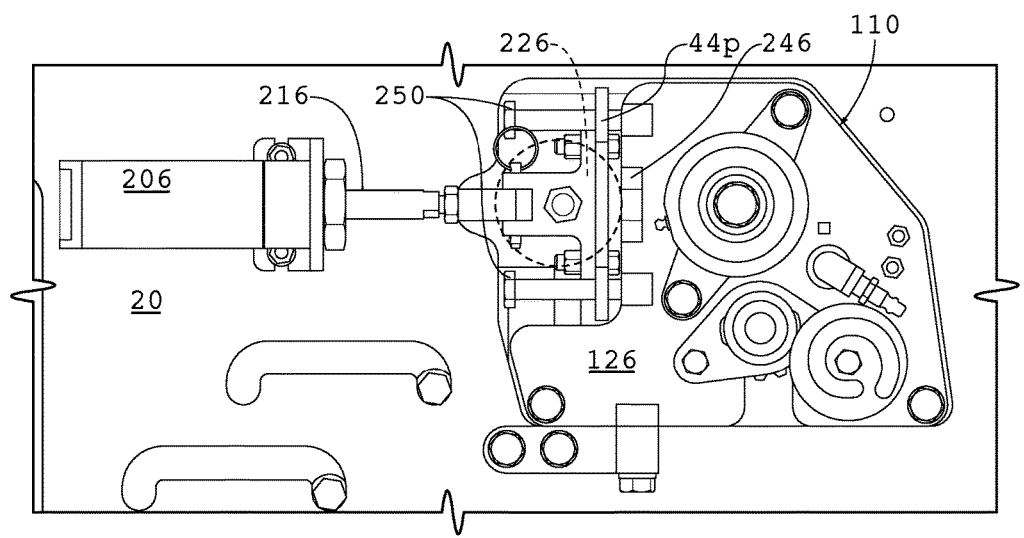
FIG. 12 is a right side view illustrating the embodiment of FIG. 11 with the disk 236 rendered transparent.
Figure 13:
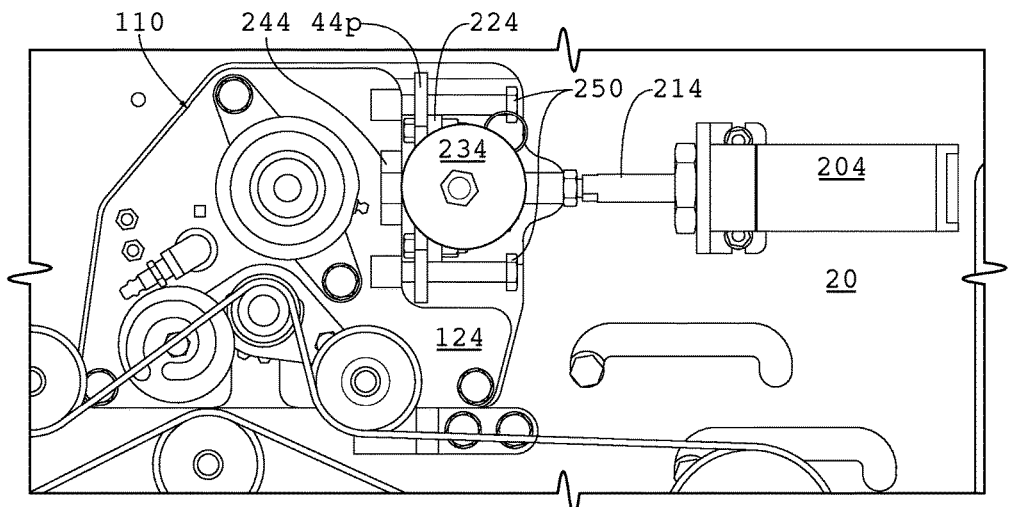
FIG. 13 is a left side view illustrating an embodiment that adjusts the position of the cartridge.
Figure 14:
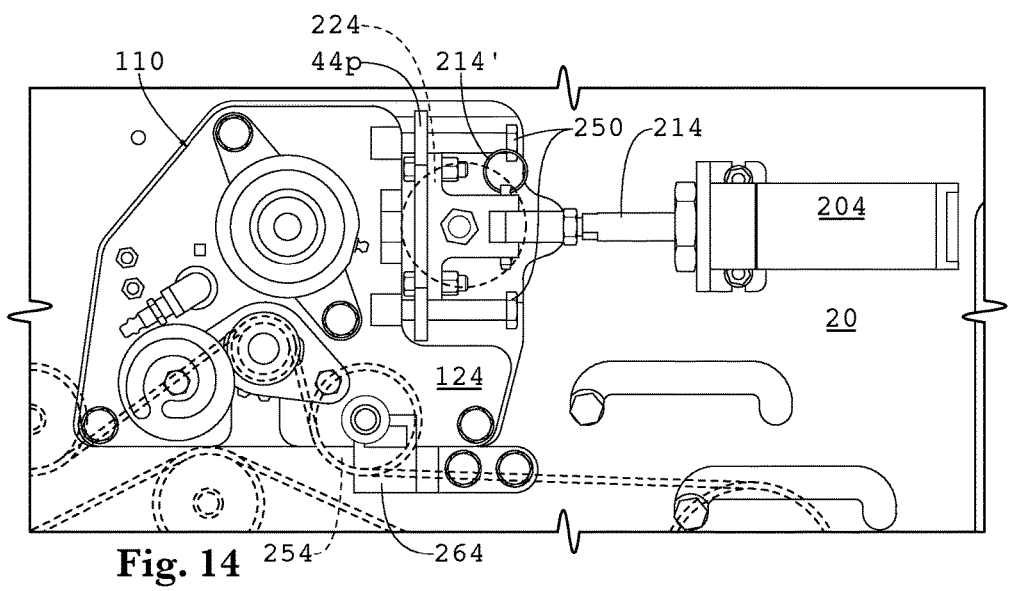
FIG. 14 is a right side view illustrating the embodiment of FIG. 13 with the disk 234 and a drive gear rendered transparent.

The gripper 42 and cleaning roller 46 are rotatably mounted to the plates 124 and 126, such as through bearings that are mounted by bolts to the plates 124 and 126, on the cartridge 110 shown in FIGS. 8-10. For example, as shown in FIGS. 8 and 10, the bearing 126b is bolted to the plate 126, and the bearing 124b is bolted to the plate 124. The shaft around which the gripper 42 is mounted extends rotatably through the bearings 124b and 126b, and the bearings 124b and 126b restrain the gripper 42 along its length so that the gripper 42 may not be displaced relative to the plates 124 and 126, except rotationally about its axis. The gear 42g is driven by the belt 7 as shown in FIG. 3. Similarly, the cleaning roller 46 may be rotatably mounted through bearings to the plates 124 and 126 so that its radial position relative to the gripper 42 can be set by the position of the bearings. Because the gripper 42 and the cleaning roller 46 are fixed in their radial positions relative to the plates 124 and 126 by the positioning of the bearings, when the cartridge 110 is mounted to the apparatus 10, the gripper 42 and the cleaning roller 46 are also fixed in their radial positions relative to the rest of the apparatus 10.

Figure 17:
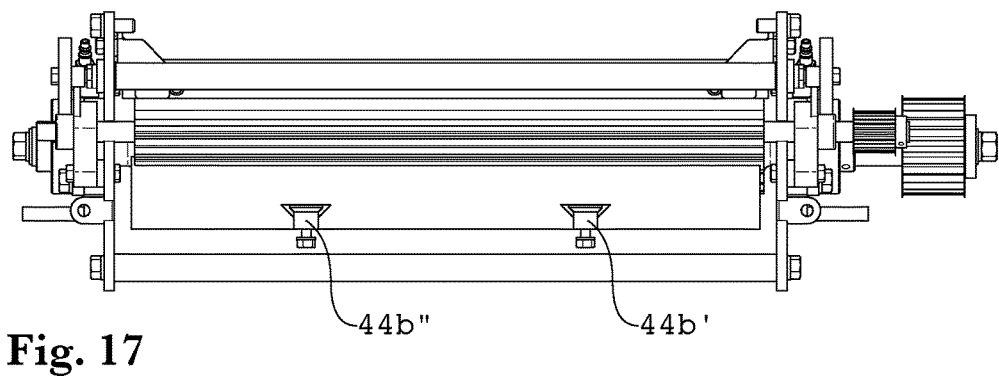
FIG. 17 is a top view illustrating the cartridge of FIG. 8.
Figure 18:
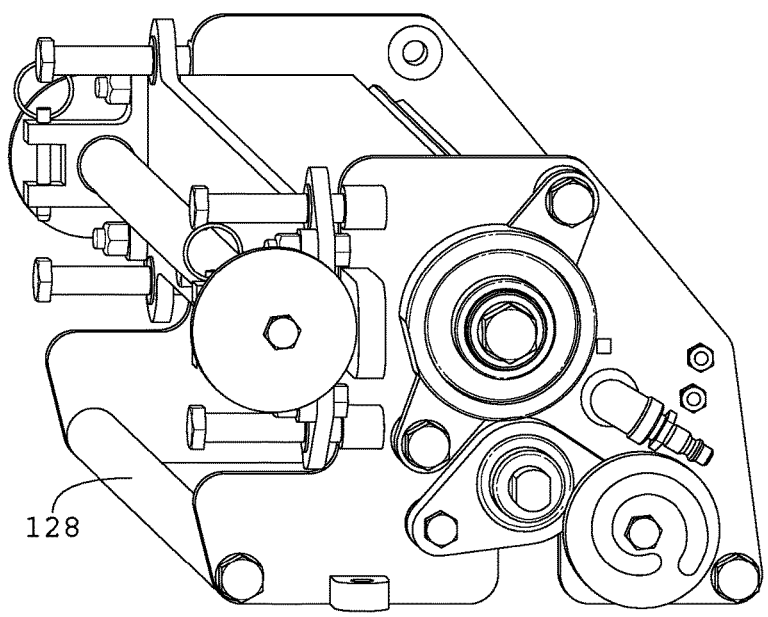
FIG. 18 is a view in perspective illustrating the preferred cartridge.

The pinch block 44 may be mounted directly to the plates 124 and 126 by bolts, weldments or any other fastener. The pinch block 44 may alternatively be mounted between the plates 124 and 126, so that the plates 124 and 126 prevent movement of the pinch block 44 relative to the plates 124 and 126 laterally across the product path. The pinch block 44 may be attached to pinch block supports, which may be a plate 44p that retains the pinch block 44 from moving radially relative to the axle of the gripper 42. The plate 44p may be metal, plastic, or any other suitable material. The plate 44p may be mounted to the pinch block 44 by two fasteners 44b' and 44b" (see FIG. 8) that insert into slots formed in the pinch block 44 (FIG. 17). The slots may be dovetail-shaped and extend from the lower surface of the pinch block 44 upwardly into the pinch block 44. The fasteners may be screws that extend through the plate 44p and flare out at their opposite ends in the slots to prevent removal of the fasteners from the slots except by sliding out of the lower surface of the pinch block 44. Such a configuration permits removal of the pinch block 44 without removing the cartridge, as explained below.

Figure 15:
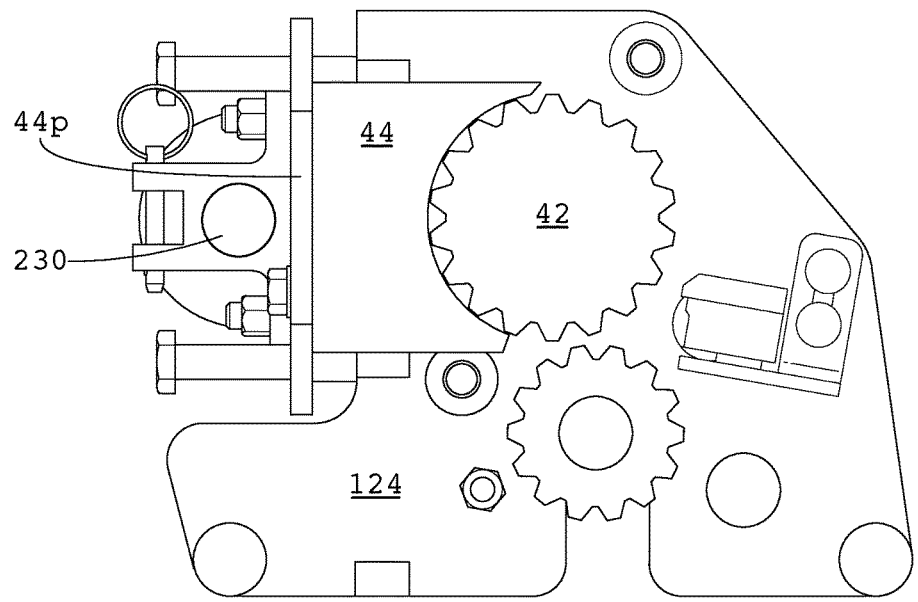
FIG. 15 is a schematic side view in section illustrating an embodiment of the cartridge with an embodiment of an adjustment mechanism.
Figure 16:
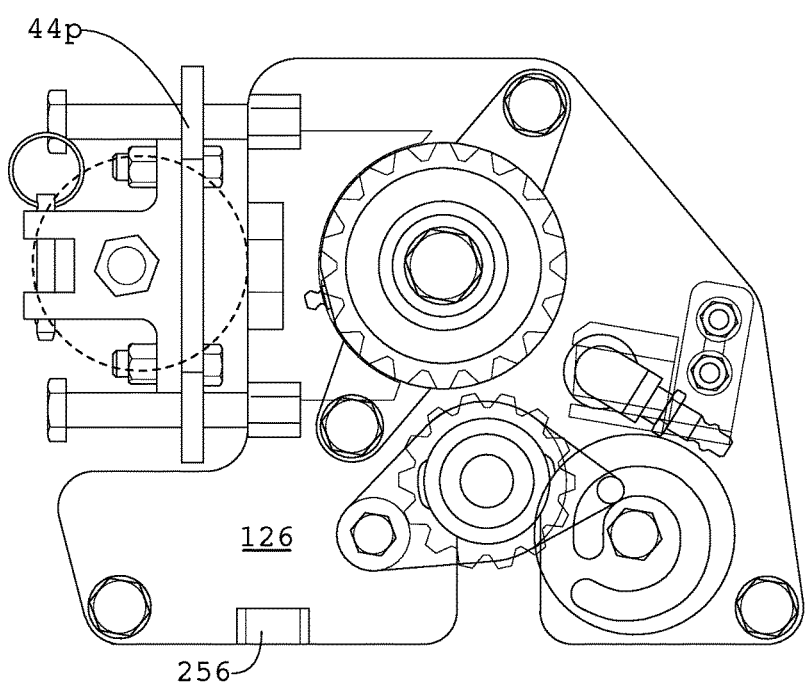
FIG. 16 is a schematic side view of the embodiment of FIG. 15 with some structures shown transparent.

The gripper 42 is preferably disposed in the arcuate void formed in the opposite side of the pinch block 44 from the plate 44p, as shown in the section view of FIG. 15 in an operable configuration. The plate 44p is mounted to the plates 124 and 126 by an adjustment mechanism that permits radial movement of the pinch block 44 relative to the gripper's 42 axis of rotation, and this radial movement may be in an upstream and/or downstream direction. One embodiment that provides such adjustment is described below, but it is sufficient for the purpose of the invention to substitute any other structure that can provide such radial movement to adjust the position of the pinch block 44 relative to the gripper 42 as described herein.

As shown in FIGS. 11-17, a plurality of structures mount the cartridge 110 to the frame 20 and adjust the pinch block's 44 position relative to the gripper 42. These structures include a pair of prime movers, which may be the pneumatic rams 204 and 206 that are mounted to the frame 20. The rams 204 and 206 each have a moveable arm 214 and 216, respectively, and each of the arms 214 and 216 moves linearly between an extreme inserted position and an extreme protruded position. Each arm 214 and 216 extends to removable and rigid attachment to one of two yokes 224 and 226 when the cartridge 110 is fully inserted in the apparatus 10. Pins 214' and 216' fix the arms 214 and 216 to the yokes 224 and 226. The yokes 224 and 226, in turn rigidly mount to an end of the plate 44p, such as with screws or weldments and may thereby form part of the pinch block supports. After complete insertion of the cartridge 110 into the apparatus 10 as described below, the arms 214 and 216 are rigidly mounted to their respective yokes 224 and 226 so that linear actuation of the rams 204 and 206 moves the plate 44p in conjunction with the arms 214 and 216 and the yokes 224 and 226.

The plate 44p is slidably mounted to the end supports, which may be the plates 124 and 126. A plurality of bolts 250 (FIGS. 11-14) are mounted rigidly to the plates 124 and 126, such as by screwing into threaded apertures formed on the plates 124 and 126 so that the bolts 250 are substantially parallel to one another and skewed from the axis of the rod 230. The plate 44p is mounted on the bolts 250 in a manner that permits sliding along the lengths of the bolts 250. Thus, as the plate 44p slides along the shafts of the bolts 250, the pinch block 44, which is rigidly mounted to the plate 44p, moves radially relative to the gripper 42, and this may be parallel to the bolts 250 in a substantially upstream and/or downstream direction. This configuration thereby permits the attached pinch block 44 to slide along a path upstream and downstream relative to the gripper 42 and parallel to the bolts 250.

The ends of the rod 230 rotatably extend through bearings in, and the midsection of the rod 230 is disposed between, the yokes 224 and 226 (FIGS. 7B and 15). At the opposite ends of the rod 230, and on opposite sides of the yokes 224 and 226, each of the preferably circular disks 234 and 236 is rigidly mounted to the rod 230. The disks 234 and 236 are mounted with their centers offset from the axis of the rod 230, which causes the peripheral edges thereof to form variable-length cam surfaces that have positions depending upon the rotational position of the rod 230. Because the rod 230 is rotatably mounted to the yokes, a sufficient torque applied to the rod 230 causes rotation of the rod 230 about its axis, which causes simultaneous and equal rotation of the disks 234 and 236. The offset disk configuration creates a cam surface on each disk that may seat against one of the corresponding ears 244 and 246 that extend rigidly from the plates 124 and 126, respectively. The ears 244 and 246 are mounted to the end plates 124 and 126 to which the gripper 42 is mounted, and, therefore, the gripper 42 moves rotationally, but not radially, relative to the ears 244 and 246. The ears 244 and 246 may form part of the end supports with the plates 124 and 126.

Rotation of the rod 230 rotates the disks 234 and 236 equal amounts, and when the peripheral cam surfaces of the disks 234 and 236 are seated against the ears 244 and 246, rotation of the rod 230 equally spaces the rod 230, and its rigidly attached structures including the plate 44p and the yokes 224 and 226, from the structures rigidly attached to the ears 244 and 246, which includes the plates 124 and 126 and the gripper 42. Through the yokes' 224 and 226 rigid attachment to the plate 44p, which plate 44p is rigidly mounted to the pinch block 44 and slidably mounted along a radius of the gripper 42, the position of the rod 230 and disks 234 and 236 relative to the ears 244 and 246 determines the longitudinal position of the pinch block 44 relative to the gripper 42. Thus, the configuration of the adjustment mechanism components described herein allows precise, simultaneous, and equal adjustment to the position of the cam surfaces of the disks 234 and 236 relative to the ears 244 and 246 simply by rotating the rod 230. This results in the rod 230 affecting the position of the arcuate surface of the pinch block 44 relative to the gripper 42. Because adjustment of the single rod 230 adjusts the positions of the opposite ends of the pinch block 44, the usefulness of the apparatus is apparent. Precise adjustment of the longitudinal stop position of the pinch block 44 is thus determined by the rotational position of the rod 230.

When the cartridge 110 is inserted into the apparatus 10, the arms 214 and 216 are mounted to the yokes 224 and 226 and displaced longitudinally to drive the attached disks 234 and 236 toward the ears 244 and 246. This longitudinal movement displaces the disks 234 and 236, along with the plate 44p and the pinch block 44, until the cam surfaces of the disks 234 and 236 seat against the ears 244 and 246 and halt the upstream movement of the pinch block 44 relative to the gripper 42. If the operator of the apparatus 10 determines that the pinch block 44 should be positioned further upstream of the gripper 42 from the position the pinch block 44 is moved to by actuation of the rams 204 and 206, this is readily accomplished after the rams 204 and 206 are actuated to pull the pinch block 44 away from the gripper 42. The rod 230 may then be rotated to move the cam surfaces of the disks 234 and 236 an equal amount relative to the ears 244 and 246. The rams 204 and 206 are actuated again to drive the attached disks 234 and 236 toward the ears 244 and 246.

This longitudinal movement displaces the disks 234 and 236, along with the plate 44p and the pinch block 44, until the cam surfaces of the disks 234 and 236 seat against the ears 244 and 246 and halt the upstream movement of the pinch block 44 relative to the gripper 42 farther upstream than previously, as determined by the amount the rod 230 is rotated. These steps may be carried out until the desired longitudinal position of the pinch block 44 is reached. A more downstream position of the pinch block 44 relative to the gripper 42 is set by reverse rotation of the rod 230. Because the gripper 42 is mounted to the plates 124 and 126 with only rotational relative movement possible, the desired even gap along the entire length between the pinch block 44 and the gripper 42 may be set by rotation of the rod 230 and disks, and that gap will remain as long as the rod 230 is not deliberately moved.

The preferred cartridge 110 is mounted in the apparatus 10 by insertion of one end into the side of the frame 20 that is farthest from the motor 6 and belt 7, preferably below the sidewall 26. The plate 124 first rests upon the frame members 128' and 129', and the cartridge 110 is further inserted through the aperture manually, such as by pushing the cartridge with the plate-connecting rod members 128 and 129 resting on the frame members 128' and 129' until the rod members 128 and 129 rest in frame members 128' and 129' that mount to the frame 20 (see FIG. 5). As shown more clearly in FIG. 7B, the frame members 128' and 129' have upwardly-facing channels that receive the rod members 128 and 129. The channels face one another and define inwardly-facing surfaces between which there is a gap that is slightly larger than the space between the rod members 128 and 129. The weight of the cartridge 110 rests upon the frame members 128' and 129', and the position of the cartridge 110 in the stream is determined by the inwardly-facing surfaces, which prevent the rod members 128 and 129 from being disposed too far upstream or too far downstream.

The cartridge 110 is inserted into the apparatus 10 and the rod members 128 and 129 rest on the frame members 128' and 129'. Upon complete insertion, as shown in FIGS. 11-14, the tongue 254 inserts into the opening in the member 264 that is rigidly mounted to the frame 20 at the cartridge end closest to the motor 6, and the tongue 256 is screwed to the member 266 on the frame 20 at the cartridge end farthest from the motor 6. With this configuration, the plates 124 and 126 are rigidly mounted to the frame 20, and are preferably parallel to the sidewalls 24 and 26.

The gear 42g that is driven by the drive belt 7 (FIG. 3) extends from rigid attachment to the axle of the gripper 42.

Thus, the belt 7 drives the gear 42*g*, which thereby drives the gripper 42. Upon insertion of the cartridge 110 into the apparatus 10, the belt 7 is extended around the gear 42*g* and the drive motor 6 is drivingly linked to the gripper 42. It is contemplated that a pneumatic or other belt-tensioning apparatus may be used to tighten the belt 7, such as by applying a force through an idler wheel on a span of the belt 7.

The cartridge 110 is removed from the frame 20 in a process reversed from the above insertion, and replaced with a similar cartridge as described above. The position between the pinch block 44 and the gripper 42 of the replacement cartridge is adjusted by mounting the replacement cartridge's yokes to the rams 204 and 206 and actuating the rams 204 and 206. The precise pinch block 44 location is then adjusted by rotating the rod 230 of the replacement cartridge so that the disks seat against the corresponding ears 244 and 246 at the desired distance from the axle of the rod, thereby spacing the pinch block 44 the desired distance from the gripper 42 along the entire length of the gripper 42.

It is contemplated to remove the pinch block 44 from the cartridge 110 without removing the entire cartridge from the apparatus 10. This is accomplished, with reference to FIG. 6, by pivoting the two sidewalls 24 and 26, and their attached guides 51-54, belt 50 and other structures, about the axle of the driven gear 55. This entire assembly 59 is thus pivoted about the axis of the driven gear 55 upwardly and downstream, thereby opening a space directly above the pinch block. The rams 204 and 206 are withdrawn, which pulls the pinch block 44 away from the gripper 44. The gripper 44 is then manually lifted upwardly through this space and removed. The movement is permitted due to the manner by which the pinch block 44 mounts to the plate 44*p*, which is preferably by fasteners 44*b*' and 44*b*" aligned in the slots shown in FIG. 17 (viewed from the bottom looking upwardly). Thus, the flared fastener ends that prevent relative movement between the plate 44*p* and the pinch block 44 in the direction of movement of poultry, allows an upward force on the pinch block 44 to slide the pinch block 44 away from the fasteners.

In another embodiment, the pinch block 44 may be fixed to the end supports, and the gripper may be adjustably mounted to the end supports, which may be the plates 124 and 126, in a configuration that essentially reverses the manner of attachment of each of the pinch block and the gripper. The adjustable, longitudinal mounting of a rotating structure, such as the gripper, is more complex than the adjustable longitudinal mounting of a stationary structure, and therefore this reversal is not preferred.

In another embodiment of the mechanism that adjusts the longitudinal position of the pinch block 44, a pair of pivoting arms, one at each side of the cartridge, are actuated by rams, and the arms may seat against a plate's opposing ends. The pivoting arms force the plate against cam surfaces that mount on a rod extending through the end supports. The cam surfaces receive the ends of the plate, as forced by the rams and arms, and by adjusting the rod one may adjust the variable distances between the cam surfaces and the gripper's axis of rotation. This positioning of the cam surfaces on the end supports onto which the plate seats contrasts with the preferred embodiment, in which the cam surfaces are attached to the plate 44*p* and seat against extensions of the end supports (the plates 124 and 126).

Figure 19:
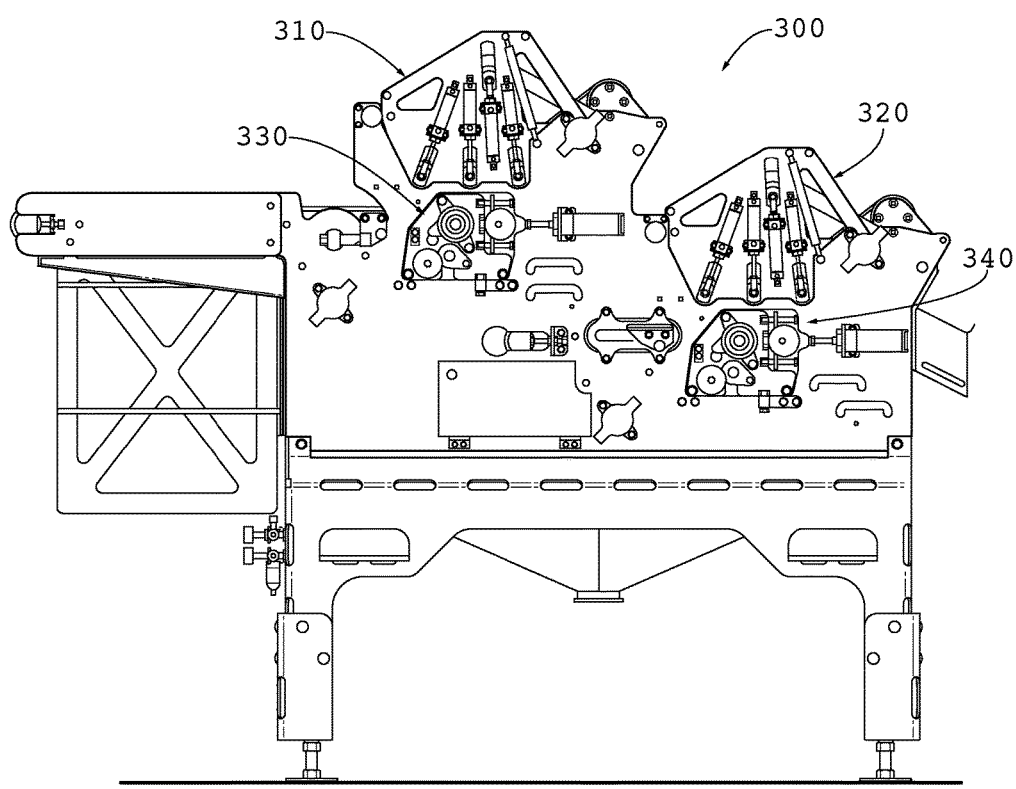
FIG. 19 is a side view illustrating an alternative embodiment of the present invention.

As shown in FIG. 19, the biased guides and belt described herein may be used in single and multiple skinners. For example, the apparatus 300 has a first assembly 310 including biased guides and a belt similar to those shown and described herein that skins poultry parts or other food products. A similar second assembly 320 is also mounted on the apparatus 300. Still further, a cartridge 330 that is similar to the cartridge 110 is mounted beneath the assembly 310 in the orientation shown in FIG. 19. A cartridge 340 that is similar to the cartridge 110 is mounted beneath the assembly 320 in the orientation of FIG. 19. The structures work as in the embodiment described above, but in series. Of course, the structures may be aligned to work in parallel.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. An improved automated poultry product skinning apparatus including a support frame having a product inlet and a product outlet near opposite longitudinal ends of the support frame, a laterally-oriented gripper rotatably mounted to the frame and having a plurality of radially extending fins for engaging a lower side of the poultry product, and a laterally-oriented pinch block including an arcuate surface fixedly positioned in close clearance relationship to an arcuate path of the fins, the improvement comprising:
   a conveyor mounted to the support frame above the gripper and aligned to engage an upper surface of a piece of poultry product delivered to the inlet and direct the poultry product in a product path over the gripper and toward the outlet, the conveyor including an endless loop belt that extends around, and is biased toward the gripper by, a laterally-oriented first guide having opposing first and second ends that are moveably mounted to the support frame near opposite lateral edges of the product path to permit vertical movement of the first and second ends of the first guide relative to the support frame.

2. The improved automated poultry product skinning apparatus in accordance with claim 1, further comprising:
   (a) a first spring mounted between the first guide's first end and the support frame, the first spring biasing the first guide's first end toward the gripper;
   (b) a second spring mounted between the first guide's second end and the support frame, the second spring biasing the first guide's second end toward the gripper independently of the first guide's first end.

3. The improved automated poultry product skinning apparatus in accordance with claim 2, further comprising:
   (a) a laterally-oriented second guide disposed downstream from the first guide and around which the endless loop belt extends, the second guide having opposing first and second ends that are moveably mounted to the support frame near opposite lateral edges of the product path to permit vertical movement of the first and second ends of the second guide relative to the support frame;
   (b) a third spring mounted between the second guide's first end and the support frame, the third spring biasing the second guide's first end toward the gripper; and
   (c) a fourth spring mounted between the second guide's second end and the support frame, the fourth spring biasing the second guide's second end toward the gripper independently of the second guide's first end, wherein the second guide is configured to move relative to the gripper and relative to the first guide.

4. The improved automated poultry product skinning apparatus in accordance with claim 3, wherein the opposing ends of the first guide are slidably mounted in first and second slots in opposing supporting frame sidewalls, and the opposing ends of the second guide are slidably mounted in third and fourth slots in opposing supporting frame sidewalls.

5. The improved automated poultry product skinning apparatus in accordance with claim 3, further comprising:
   (a) a laterally-oriented third guide around which the endless loop belt extends, the third guide having opposing first and second ends that are moveably mounted to the support frame near opposite lateral edges of the product path to permit vertical movement of the first and second ends of the third guide relative to the support frame;
   (b) a fifth spring mounted between the third guide's first end and the support frame, the fifth spring biasing the third guide's first end away from the gripper;
   (c) a sixth spring mounted between the third guide's second end and the support frame, the sixth spring biasing the third guide's second end away from the gripper independently of the third guide's first end, wherein the third guide is configured to move relative to the gripper and relative to the first and second guides.

6. The improved automated poultry product skinning apparatus in accordance with claim 5, wherein the support frame further comprises first and second sidewalls spaced apart and positioned on opposite lateral sides of the product path, the first and second sidewalls having a first pair of elongated slots in which the opposing ends of the first guide are slidably mounted, a second pair of elongated slots in which the opposing ends of the second guide are slidably mounted, and a third pair of elongated slots in which the opposing ends of the third guide are slidably mounted.

7. An improved automated poultry product skinning apparatus including a support frame having a product inlet and a product outlet near opposite longitudinal ends of the support frame, a conveyor mounted to the support frame and aligned to engage the upper surface of a piece of poultry product delivered to the inlet and direct the poultry product in a product path toward the outlet, a laterally-oriented gripper having a plurality of radially extending fins disposed below the conveyor for engaging a lower side of the poultry product passing in the product path between the gripper and the conveyor, and a laterally-oriented pinch block including an arcuate surface fixedly positioned in close clearance relationship to an arcuate path of the fins during a portion of their rotation to define an opening configured to engage the outer skin attached to the poultry product between the fins and the arcuate surface of the pinch block, wherein the close clearance relationship and the opening are configured to firmly entrap the attached outer skin between the fins and the arcuate surface of the pinch block to pull the outer skin from its attachment to the underlying muscle portions of the poultry product, the improvement comprising:
   (a) first and second support members removably mounted to the support frame on opposing first and second lateral sides of the product path;
   (b) the gripper rotatably mounted to and between the first and second support members;
   (c) the pinch block mounted to and between the first and second support members; and
   (d) an adjuster mounted to the first and second support members and drivingly linked to at least one of the gripper and the pinch block for adjusting the opening between the gripper and the pinch block, wherein the gripper, the pinch block and at least a portion of the adjuster are configured to be removed from the support frame with the first and second support members as a unit.

8. The improved automated poultry product skinning apparatus in accordance with claim 7, wherein the adjuster is mounted to the first and second support members and drivingly linked to a plate to which the pinch block is mounted.

9. The improved automated poultry product skinning apparatus in accordance with claim 8, wherein the adjuster further comprises first and second members rotatably mounted through first and second yokes that are attached near opposite ends of the plate, the members having cam surfaces configured to seat against ears extending from the support members.

10. The improved automated poultry product skinning apparatus in accordance with claim 9, further comprising a rod rotatably mounted through the first and second yokes and attached to the first and second members.

11. The improved automated poultry product skinning apparatus in accordance with claim 9, further comprising at least one plate-connecting rod member mounted to the first and second plates, said at least one plate-connecting rod member configured to rest in at least one channel formed in a frame member.

12. An automated poultry product skinning apparatus comprising:
   (a) a frame having a product inlet and a product outlet near opposite longitudinal ends of the support frame;
   (b) a conveyor mounted to the frame and aligned to engage the upper surface of a piece of poultry product delivered to the inlet and direct the poultry product in a product path toward the outlet;
   (c) first and second end supports removably mounted to the frame on opposing first and second lateral sides of the product path;
   (d) a laterally-oriented gripper rotatably mounted to, and between, the first and second end supports, the gripper having a plurality of radially extending fins disposed below the conveyor for engaging a lower side of the poultry product passing in the product path; and
   (d) a laterally-oriented pinch block slidably mounted to, and between, the end supports, the pinch block including an arcuate surface fixedly positioned in close clearance relationship to an arcuate path of the fins during a portion of their rotation to define an opening configured to engage the outer skin attached to the poultry product between the fins and the arcuate surface of the pinch block, wherein the close clearance relationship and the opening are configured to firmly entrap the attached outer skin between the fins and the arcuate surface of the pinch block to pull the outer skin from its attachment to underlying muscle portions of the poultry product, the pinch block also including pinch block supports rigidly mounted to the pinch block;
   (e) at least one prime mover mounted to the frame and configured to displace the pinch block relative to the first and second end supports; and
   (f) first and second cam surfaces movably mounted to a first of the supports, the cam surfaces being rigidly connected together and seating against a second of the supports for adjusting the opening between the gripper and the pinch block, wherein the gripper, the pinch block, the cams and the end supports are configured to be removed from the frame as a unit.

13. The improved automated poultry product skinning apparatus in accordance with claim 12, wherein the first and second cam surfaces are rigidly mounted to a rod that is rotatably mounted to the pinch block supports and seat against ears extending from rigid attachment to the end supports.

14. The improved automated poultry product skinning apparatus in accordance with claim 13, wherein the pinch block supports further comprise first and second yokes that are attached near opposite ends of a plate that is rigidly and removably mounted to the pinch block.

15. The improved automated poultry product skinning apparatus in accordance with claim 14, wherein the rod rotatably mounts through the first and second yokes and attaches to the structures defining the cam surfaces.

16. The improved automated poultry product skinning apparatus in accordance with claim 14, further comprising at least one plate-connecting rod member mounted to the end supports, said at least one plate-connecting rod member configured to rest in at least one channel formed in the frame.

* * * * *